US012469296B2

United States Patent
Koga

(10) Patent No.: US 12,469,296 B2
(45) Date of Patent: Nov. 11, 2025

(54) SUSPICIOUS PERSON ALARM NOTIFICATION SYSTEM AND SUSPICIOUS PERSON ALARM NOTIFICATION METHOD

(71) Applicant: i-PRO Co., Ltd., Tokyo (JP)

(72) Inventor: Masashi Koga, Tokyo (JP)

(73) Assignee: I-PRO CO., LTD., Tokyo (JP)

( * ) Notice: Subject to any disclaimer, the term of this patent is extended or adjusted under 35 U.S.C. 154(b) by 196 days.

(21) Appl. No.: 18/242,908

(22) Filed: Sep. 6, 2023

(65) Prior Publication Data

US 2023/0410519 A1     Dec. 21, 2023

Related U.S. Application Data

(63) Continuation of application No. PCT/JP2022/003447, filed on Jan. 28, 2022.

(30) Foreign Application Priority Data

Mar. 8, 2021 (JP) .................................. 2021-036420

(51) Int. Cl.
  *G06V 20/52* (2022.01)
  *G01S 7/41* (2006.01)
  (Continued)

(52) U.S. Cl.
  CPC .............. *G06V 20/52* (2022.01); *G01S 7/415* (2013.01); *G01S 13/867* (2013.01);
  (Continued)

(58) Field of Classification Search
  None
  See application file for complete search history.

(56) References Cited

U.S. PATENT DOCUMENTS

| 2011/0050875 A1 | 3/2011 | Nagata et al. |
| 2011/0050876 A1 | 3/2011 | Nagata et al. |

(Continued)

FOREIGN PATENT DOCUMENTS

| CN | 111166357 A | * | 5/2020 |
| CN | 111481184 |   | 8/2020 |

(Continued)

OTHER PUBLICATIONS

International Search Report (ISR) from International Searching Authority (Japan Patent Office) in International Pat. Appl. No. PCT/JP2022/003447, dated Apr. 5, 2022, together with an English language translation.
Office Action from Japan Patent Office (JPO) in Japanese Patent Appl. No. 2023-505200, dated Aug. 19, 2025, together with an English language translation.

*Primary Examiner* — James M Anderson, II
(74) *Attorney, Agent, or Firm* — Greenblum & Bernstein, P.L.C.

(57) ABSTRACT

A suspicious person alarm notification system includes one camera including artificial intelligence and a radar and capturing an image of a person, and a server communicating with the camera. The camera receives a signal presenting in an emission direction of the radar, acquires vital information on the person from the signal, acquires, by using the artificial intelligence, motion information on the person from a captured image, calculate an index indicating suspicious person likelihood of the person based on the vital information and the motion information on the person, and transmit, to the server, person information related to the person in response to determining that the index is equal to or greater than a threshold value. The server outputs an alarm indicating that a suspicious person is detected.

15 Claims, 11 Drawing Sheets

(51) Int. Cl.
*G01S 13/86* (2006.01)
*G01S 13/88* (2006.01)
*G06T 7/20* (2017.01)
*G06V 10/70* (2022.01)
*G06V 40/10* (2022.01)
*G06V 40/20* (2022.01)
*G08B 13/196* (2006.01)
*H04N 7/18* (2006.01)

(52) U.S. Cl.
CPC .............. *G01S 13/886* (2013.01); *G06T 7/20* (2013.01); *G06V 10/70* (2022.01); *G06V 40/15* (2022.01); *G06V 40/20* (2022.01); *G08B 13/19602* (2013.01); *H04N 7/183* (2013.01); *G06T 2207/30196* (2013.01); *G06T 2207/30232* (2013.01)

(56) References Cited

U.S. PATENT DOCUMENTS

| | | | | |
|---|---|---|---|---|
| 2011/0141277 | A1* | 6/2011 | Midkiff | .................. H04N 7/181 348/143 |
| 2020/0226898 | A1* | 7/2020 | Kinoshita | ........ G08B 13/19697 |
| 2021/0096239 | A1 | 4/2021 | Yasugi et al. | |

FOREIGN PATENT DOCUMENTS

| | | | |
|---|---|---|---|
| CN | 111657971 | A * | 9/2020 |
| CN | 112269214 | | 1/2021 |
| JP | 2010-238186 | | 10/2010 |
| JP | 2011-048547 | | 3/2011 |
| JP | 2015-187869 | | 10/2015 |
| JP | 2017-225108 | | 12/2017 |
| JP | 2019-185115 | | 10/2019 |

* cited by examiner

FIG. 11

| | FIRST EMBODIMENT | FIRST MODIFICATION OF FIRST EMBODIMENT | SECOND MODIFICATION OF FIRST EMBODIMENT |
|---|---|---|---|
| CAMERA | STEPS 100 TO 107<br>STEPS 200 TO 207<br>STEPS 300 TO 303<br>(STEPS 400 TO 403) | STEPS 100 TO 106<br>STEPS 200 TO 206<br>STEP 300 | STEPS 100 TO 106<br>STEPS 200 TO 206<br>STEPS 300, AND STEPS 302 AND 303 |
| SERVER | (STEPS 400 TO 403)<br>STEPS 404 AND 405 | STEP 107<br>STEP 207<br>STEPS 301 TO 303<br>STEPS 400 TO 405 | STEPS 400 TO 405 |
| EXTERNAL SERVER | — | — | STEP 107<br>STEP 207<br>STEP 301 |

TB2

SUSPICIOUS PERSON ALARM NOTIFICATION SYSTEM AND SUSPICIOUS PERSON ALARM NOTIFICATION METHOD

CROSS-REFERENCE TO RELATED APPLICATIONS

This is a continuation of International Application No. PCT/JP2022/003447 filed on Jan. 28, 2022, and claims priority from Japanese Patent Application No. 2021-036420 filed on Mar. 8, 2021, the entire content of which is incorporated herein by reference.

TECHNICAL FIELD

The present disclosure relates to a suspicious person alarm notification system, a suspicious person alarm notification method, and a suspicious person alarm notification program.

BACKGROUND ART

Patent Literature 1 discloses an abnormal behavior detection device that acquires image information on a detection target, acquires feature information on the detection target based on the image information, and detects an abnormal behavior of the detection target based on a comparison result between a behavior identification result obtained by identifying a behavior of the detection target based on the feature information and behavior schedule information indicating a behavior schedule of the detection target. In response to detecting an abnormal behavior of the detection target (for example, unauthorized entry into a server room, unauthorized access to a server, or theft of a disk drive), the abnormal behavior detection device issues an alarm to an administrator or locks an electronic lock at an entrance of a room where the detection target is detected.

CITATION LIST

Patent Literature

Patent Literature 1: JP2011-48547A

SUMMARY OF INVENTION

Technical Problem

In recent years, there is a demand for detecting a sign of a crime before the crime is actually performed to prevent occurrence of the crime in advance. In Patent Literature 1, in response to detecting an abnormal behavior of a detection target, an alarm can be issued to an administrator, or an electronic lock at an entrance of a room can be locked to prevent the detection target who performs the abnormal behavior from leaving or escaping. However, in Patent Literature 1, it is difficult to detect a sign of a crime or prevent occurrence of the crime before the crime is actually performed based on a behavior identification result obtained by identifying a behavior result actually performed by the detection target.

The present disclosure is proposed in view of the related circumstances described above, and an object thereof is to provide a suspicious person alarm notification system, a suspicious person alarm notification method, and a suspicious person alarm notification program that more efficiently detect a suspicious person with a sign of a crime and efficiently support preventing of occurrence of the crime.

Solution to Problem

The present disclosure provides a suspicious person alarm notification system, including: at least one camera including artificial intelligence and a radar and being configured to capture an image of a person; and a server configured to communicate with the camera, in which the camera is configured to receive a signal emitted by the radar and reflected by an object present in an emission direction of the radar, acquire vital information on the person from the signal, acquire, by using the artificial intelligence, motion information on the person from a captured image obtained by capturing an image of the person, calculate an index indicating suspicious person likelihood of the person based on the vital information and the motion information on the person, and transmit, to the server, person information related to the person in which the vital information and the motion information on the person are associated with each other in response to determining that the index is equal to or greater than a threshold value, and the server is configured to output, based on the person information transmitted from the camera, an alarm indicating that a suspicious person is detected.

The present disclosure provides a suspicious person alarm notification method, the suspicious person alarm notification method being executed by a computer communicably connected to a server configured to output an alarm indicating that a suspicious person is detected, the suspicious person alarm notification method including: receiving a signal emitted by a radar and reflected by an object present in an emission direction of the radar; acquiring vital information on a person from the signal; acquiring, by using artificial intelligence, motion information on the person from a captured image obtained by capturing an image of the person; calculating an index indicating suspicious person likelihood of the person based on the vital information and the motion information on the person; and outputting, based on person information related to the person in which the vital information and the motion information on the person are associated with each other, an alarm indicating that a suspicious person is detected in response to determining that the index is equal to or greater than a threshold value.

The present disclosure provides a suspicious person alarm notification program that causes at least one camera to execute: the least one camera being a computer communicably connected to a server configured to output an alarm indicating that a suspicious person is detected and including artificial intelligence and a radar, a step of receiving a signal emitted by the radar and reflected by an object present in an emission direction of the radar; a step of acquiring vital information on a person from the signal; a step of acquiring, by using the artificial intelligence, motion information on the person from a captured image obtained by capturing an image of the person; a step of calculating an index indicating suspicious person likelihood of the person based on the vital information and the motion information on the person; and a step of transmitting, to the server, person information related to the person in which the vital information and the motion information on the person are associated with each other in response to determining that the index is equal to or greater than a threshold value.

Advantageous Effects of Invention

According to the present disclosure, it is possible to more efficiently detect a suspicious person with a sign of a crime and efficiently support preventing of occurrence of the crime.

BRIEF DESCRIPTION OF DRAWINGS

FIG. 11 is a table illustrating a correspondence relation between an operation procedure example illustrated in FIGS. 3 to 5 and 7 and an operation procedure example of the suspicious person detection system according to each embodiment.

DESCRIPTION OF EMBODIMENTS

Hereinafter, an embodiment in which a suspicious person alarm notification system, a suspicious person alarm notification method, and a suspicious person alarm notification program according to the present disclosure are disclosed specifically will be described in detail with reference to the accompanying drawings as appropriate. However, unnecessarily detailed description may be omitted. For example, detailed descriptions of already well-known matters and redundant descriptions of substantially the same configuration may be omitted. This is to avoid unnecessary redundancy of the following description and facilitate understanding of a person skilled in the art. The accompanying drawings and the following description are provided for a person skilled in the art to sufficiently understand the present disclosure, and are not intended to limit the subject matter described in the claims.

First Embodiment

Figure 1:
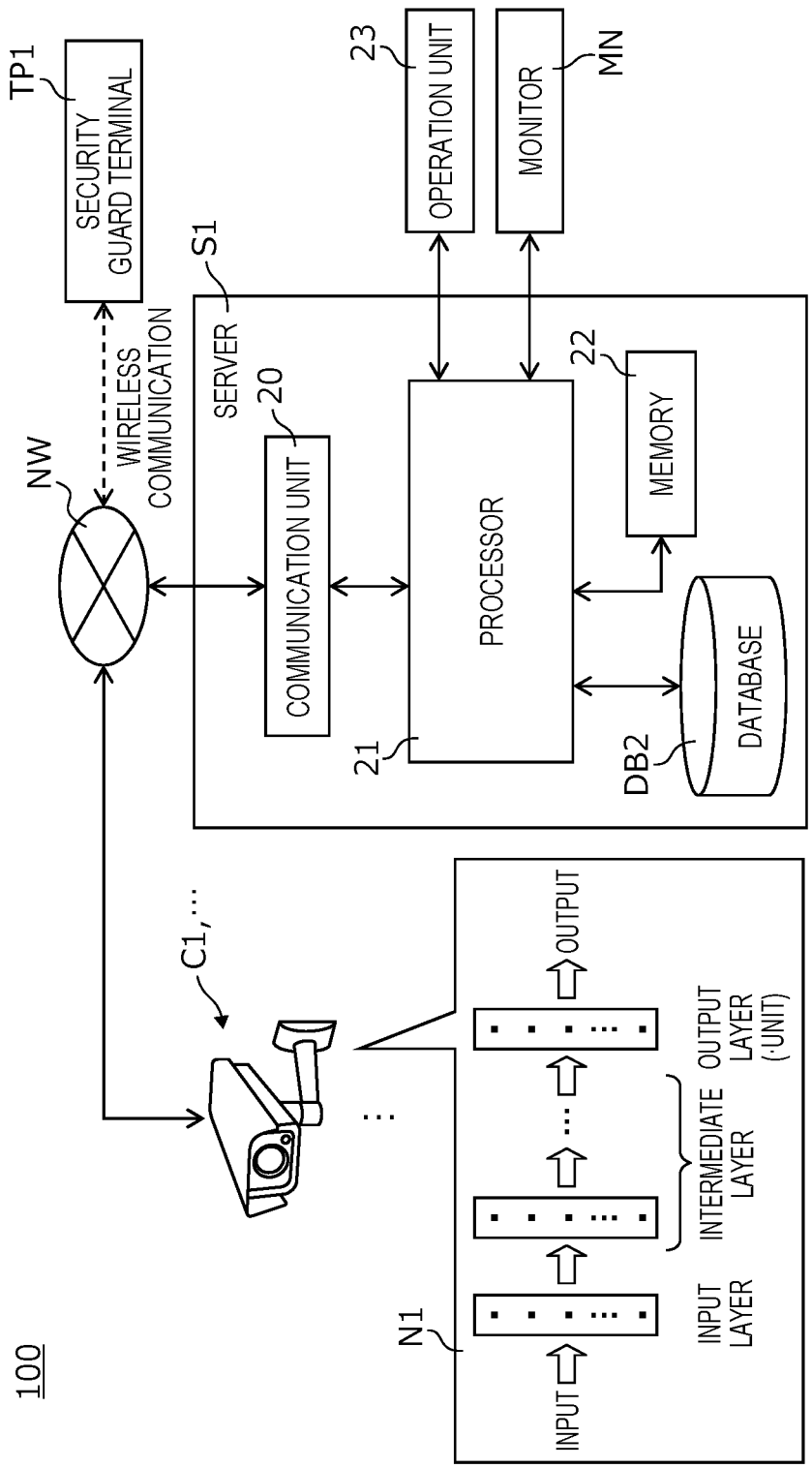
FIG. 1 is a block diagram illustrating a system configuration example of a suspicious person detection system according to a first embodiment.

FIG. 1 is a diagram illustrating a system configuration example of a suspicious person detection system 100 (an example of a suspicious person alarm notification system) according to a first embodiment. The system configuration of the suspicious person detection system 100 illustrated in FIG. 1 is an example, and the system configuration of the suspicious person detection system 100 is not limited thereto. The suspicious person detection system 100 according to the first embodiment analyzes, by one or more cameras C1, . . . installed at various indoor and outdoor positions and including a millimeter wave radar, vital information on a person positioned within angles of view of the cameras C1, . . . and motion information (for example, an expression, and a motion of a body of the person) on the person. The suspicious person detection system 100 calculates a crime index (score) based on an analysis result such as an emotion index of the person positioned within the angles of view of the cameras C1, . . . and the motion information on the person. In response to determining that the calculated crime index (score) satisfies an alarm condition, the suspicious person detection system 100 generates an alarm notifying that a suspicious person is detected and outputs the alarm to a preset notification (report) destination.

The crime index (score) referred to here is a score indicating a probability of executing a crime based on an emotion such as tension, stress, an excitement state, and an attacking property before a criminal (a suspicious person) performs a crime and a behavior before the criminal (the suspicious person) performs the crime, and indicates a degree (a probability) of a sign of the crime. The crime index (score) indicates that the probability of executing the crime increases in proportion to a magnitude of the score (that is, a sign before the crime is executed).

The suspicious person detection system 100 according to the first embodiment includes the one or more cameras C1, . . . , a server S1, at least one monitor MN or security guard terminal TP1, and a network NW.

Each of the plurality of cameras C1, . . . in the first embodiment is connected to the server S1, the security guard terminal TP1, or an external server S2 via the network NW in a wired or wireless manner. The wireless communication referred to here is, for example, short-range wireless communication such as Bluetooth (a registered trademark) or NFC (a registered trademark), or communication via a wireless local area network (LAN) such as Wi-Fi (a registered trademark).

Each of the plurality of cameras C1, . . . is, for example, a monitoring camera such as a security camera, and is a camera equipped with artificial intelligence (AI). Each of the plurality of cameras C1, . . . analyzes a reflected wave of a millimeter wave radar 17 by using a trained AI model (a so-called learning model), and acquires a position of a person positioned within an angle of view of a host camera and vital information (for example, information such as heartbeat, pulse, and breathing) on the person. Each of the plurality of cameras C1, . . . calculates, based on the acquired vital information, the emotion index by estimating an emotion of each person positioned within the angle of view of the host camera. Each of the plurality of cameras C1, . . . analyzes a captured image obtained by capturing an image of a monitoring area corresponding to the angle of view of the host camera by using the trained AI model, and acquires the position of the person positioned within the angle of view of the host camera and the motion information (information such as the expression, a line of sight, a behavior, a frame, and a posture) on the person.

Each of the plurality of cameras C1, . . . acquires a behavior analysis result obtained by analyzing the behavior of the person (for example, stability of the posture, an amount of change in the line of sight, and a degree of overlap of a moving line) based on the acquired motion information. Each of the plurality of cameras C1, . . . calculates the crime index (score) based on the emotion index and the behavior analysis result of the person, and determines whether the calculated crime index (score) satisfies the alarm condition. In response to determining that the calculated crime index (score) satisfies the alarm condition, each of the plurality of cameras C1, . . . generates an alarm notification indicating that a suspicious person is detected. Each of the plurality of cameras C1, . . . associates the generated alarm notification with various data used for calculating the crime index (score) of the person and transmits to the server S1 or the security guard terminal TP1. The various data referred to here is, for example, a face image of the person, captured video data in which the person is imaged, time series data of the vital information (first time series data), time series data of the motion information (second time series data), and information such as the emotion index, the behavior analysis result, imaging time information, and an installation position of the camera.

Figure 2:
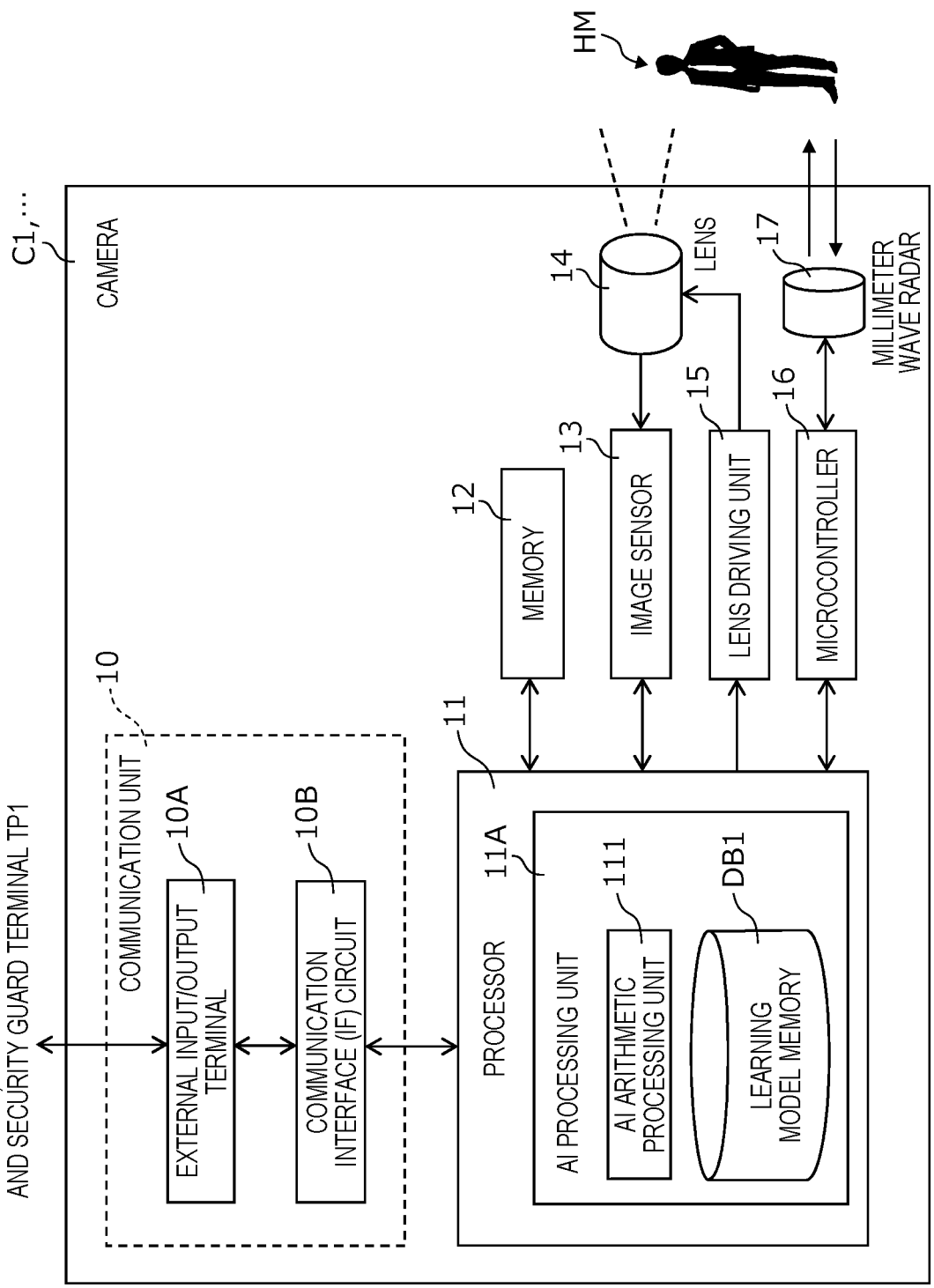
FIG. 2 is a block diagram illustrating an internal configuration example of a camera in the first embodiment.

In each of the plurality of cameras C1, . . . , a plurality of trained AI models are stored in a learning model memory DB1 (see FIG. 2). These trained AI models each serve as a parameter group for characterizing a function of AI equipped in each of the plurality of cameras C1, . . . . That is, the trained AI model serves as a parameter group for executing various arithmetic processing for calculating the crime index (score) by using AI equipped in each of the plurality of cameras C1, . . . . The trained AI model may be, for example, a parameter group for determining an AI structure (for example, a neural network N1) constructed in each of the plurality of cameras C1, . . . . The parameter group for determining the neural network N1 includes, for example, information or weighting factors indicating a connection relation between units of the neural network N1.

Each of the plurality of cameras C1, . . . constructs the neural network N1 corresponding to various arithmetic processing for calculating the crime index (score), and is capable of detecting a corresponding object. For example, each of the plurality of cameras C1, . . . constructs a neural network for calculating the position (a direction, a distance) of the person appearing in the captured image by detecting the person appearing in the captured image, a neural network for acquiring skeleton information on the person appearing in the captured image, a neural network for calculating an emotion index of the person by using the first time series data including the vital information on the person, and a neural network for calculating the crime index (score) by using the emotion index of the person and the behavior analysis result of the person analyzed based on the motion information obtained from the skeleton information. The neural network N1 illustrated in FIG. 1 is a generic term for the four neural networks described above.

The server S1 is connected to each of the plurality of cameras C1, . . . , the security guard terminal TP1, or the external server S2 by wired communication or wireless communication via the network NW. The server S1 is connected to an operation unit 23 which can be operated by a user (for example, an employee, a security guard, or a manager of a management company that monitors the monitoring area) and the monitor MN that can be viewed by the user in a manner of allowing data transmission and reception. In a case in which the server S1 includes the operation unit 23 and the monitor MN, the server S1 may be implemented by, for example, a personal computer (PC), a notebook PC, a tablet terminal, or a smartphone.

The server S1 outputs an alarm screen (see FIGS. 8 and 9) and the like to the monitor MN based on the alarm notification and the various data transmitted from each of the plurality of cameras C1, . . . , and causes the monitor MN to display the alarm screen. When an operation of reporting to a predetermined report destination (for example, a management company, a security company, an insurance company, or a security guard) is performed by the user, the server S1 reports the predetermined report destination based on the alarm notification transmitted from each of the plurality of cameras C1, . . . . The server S1 includes at least a communication unit 20, a processor 21, and a memory 22. A database DB2 may be implemented separately and may be connected to the server S1 in a manner of allowing data transmission and reception.

The communication unit 20 is implemented by using a communication interface circuit for transmitting and receiving data or information to and from each of the plurality of cameras C1, . . . and the security guard terminal TP1 via the network NW. The communication unit 20 outputs the alarm notification transmitted from each of the plurality of cameras C1, . . . to the processor 21 via a wireless communication network or a wired communication network. When the operation of reporting to the predetermined report destination is performed by the user, the communication unit 20 transmits the alarm notification transmitted from each of the plurality of cameras C1, . . . to the security guard terminal TP1.

The processor 21 is implemented by using, for example, a central processing unit (CPU) or a field programmable gate array (FPGA), and performs various processing and controls in cooperation with the memory 22. Specifically, the processor 21 realizes various functions by referring to programs and data stored in the memory 22 and executing the programs.

Based on an electrical signal output from the operation unit 23, the processor 21 generates the alarm screen (see FIGS. 8 and 9) to be displayed on the monitor MN, or reports to the preset report destination (for example, a mail address or a telephone number of the report destination such as the management company, the security company, the insurance company, or the security guard terminal TP1).

The memory 22 includes, for example, a random access memory (RAM) serving as a work memory used when executing various processing of the processor 21, and a read only memory (ROM) that stores a program and data defining an operation of the processor 21. The memory 22 may include a storage device including any one of storage devices such as a solid state drive (SSD) or a hard disk drive (HDD). The RAM temporarily stores data or information generated or acquired by the processor 21. A program that defines the operation of the processor 21 is written in the ROM. The memory 22 stores information on the report destination (for example, the mail address or the telephone number of the report destination such as the management company, the security company, the insurance company, or the security guard terminal TP1).

The database DB2 is implemented by using a storage device such as an HDD or an SSD. The database DB2 registers (stores) various data that is transmitted from each of the plurality of cameras C1, . . . and associated with the alarm notification for each person (specifically, for each integrated ID described later).

The operation unit 23 is a user interface implemented by using, for example, a touch panel, a button, or a keyboard. The operation unit 23 converts a received user operation into an electrical signal (a control command) and outputs the electrical signal to the processor 21. In a case in which the operation unit 23 is implemented by using a touch panel, the operation unit 23 is implemented integrally with the monitor MN.

The monitor MN is implemented by using a display such as a liquid crystal display (LCD) or an organic electroluminescence (EL). The monitor MN displays the alarm screen (see FIGS. 8 and 9) generated and output by the processor 21.

The security guard terminal TP1 is connected to each of the plurality of cameras C1, . . . and the server S1 via the network NW in a manner of allowing data transmission and reception. The security guard terminal TP1 is used by a security guard, an employee of a building, and the like who guards an area monitored by each of the plurality of cameras C1, . . . , and is implemented by, for example, a notebook PC, a tablet terminal, or a smartphone. The security guard terminal TP1 generates and displays a screen based on the alarm notification transmitted from each of the plurality of cameras C1, . . . or the server S1. The number of security guard terminals TP1 is one as illustrated in FIG. 1, but may be two or more.

Next, an internal configuration example of each of the plurality of cameras C1, . . . in the first embodiment will be described with reference to FIG. 2. Each of the plurality of cameras C1, . . . in the first embodiment has the same configuration, and thus only an internal configuration of the camera C1 will be described here, and descriptions and illustrations of internal configurations of the other cameras will be omitted.

The camera C1 includes a communication unit 10, a processor 11, a memory 12, an image sensor 13, a lens 14, a lens driving unit 15, a microcontroller 16, and a millimeter wave radar 17. The microcontroller 16 and the millimeter wave radar 17 may be implemented separately from the camera C1 and may be connected to the camera C1 in a manner of allowing data communication.

The communication unit 10 is implemented by using a communication interface (IF) circuit 10B for transmitting and receiving data or information to and from the server S1 and the security guard terminal TP1 via the network NW. The communication unit 10 transmits various data (for example, the captured video data, captured image data, and the alarm notification) output from the processor 11 to the server S1 via the network NW through the wireless communication network or the wired communication network. The communication unit 10 includes an external input/output terminal 10A and the communication IF circuit 10B.

The external input/output terminal 10A is, for example, a local area network (LAN) terminal, or a universal serial bus (USB) terminal, and connects the camera C1 and the network NW in a manner of allowing data communication.

The processor 11 is implemented by using, for example, a CPU or an FPGA, and performs various processing and controls in cooperation with the memory 12. Specifically, the processor 11 realizes various functions by referring to programs and data stored in the memory 12 and the learning model memory DB1 and executing the programs. Various functions referred to here include a function of specifying the position of the person, a function of analyzing and acquiring the motion information on the person, a function of calculating the emotion index of the person based on the vital information on the person, a function of calculating the crime index, a function of determining whether the person is a suspicious person, a function of executing the alarm notification, and the like. The processor 11 includes an AI processing unit 11A.

The AI processing unit 11A forms the neural network N1 (see FIG. 1) based on one trained AI model. The AI processing unit 11A can execute each of the trained AI models stored in the learning model memory DB1 to form the corresponding neural network N1, thereby executing image analysis processing on the captured image, executing signal analysis on the vital information acquired based on a reception signal of the millimeter wave radar 17, and calculating the crime index (score) of each of the persons positioned within the monitoring area (that is, within the angle of view of the camera C1). The AI processing unit 11A includes an AI arithmetic processing unit 111 and the learning model memory DB1.

The AI arithmetic processing unit 111 executes, based on applications (the trained AI models) stored in the learning model memory DB1, the signal analysis for the vital information acquired based on the reception signal of the millimeter wave radar 17 and image analysis processing for the captured image, thereby realizing the function of specifying the position of the person, the function of analyzing and acquiring the motion information on the person, the function of calculating the emotion index of the person based on the vital information on the person, the function of calculating the crime index, and the like.

The learning model memory DB1 includes, for example, a RAM serving as a work memory used when executing various processing of the AI arithmetic processing unit 111, and a ROM that stores a program and data defining an operation of the AI arithmetic processing unit 111. The learning model memory DB1 is implemented by using, for example, a storage device such as an HDD or an SSD, and stores data of the plurality of trained AI models.

Specifically, the learning model memory DB1 stores a first trained AI model capable of detecting the person appearing in the captured image by using the captured image, and calculating the position (the direction, the distance) of the person appearing in the captured image. The learning model memory DB1 stores a second trained AI model capable of acquiring the skeleton information on the person appearing in the captured image. The learning model memory DB1 stores a third trained AI model for calculating the emotion index of the person by using the first time series data including the vital information on the person. The learning model memory DB1 stores a fourth trained AI model for calculating the crime index (score) by using the emotion index of the person and the behavior analysis result of the person analyzed based on the motion information. The first to fourth trained AI models described above are examples, and the present disclosure is not limited thereto. The learning model memory DB1 may store other trained AI models used for other purposes.

The memory 12 includes, for example, a RAM serving as a work memory used when executing various processing of the processor 11, and a ROM that stores a program and data defining an operation of the processor 11. The memory 12 may include a storage device including any one of storage devices such as an SSD or an HDD. The RAM temporarily stores data or information generated or acquired by the processor 11. The program that defines the operation of the processor 11 is written in the ROM. The memory 12 stores the captured video or the captured image, or stores various data generated by the processor 11 (for example, the position, the vital information, the motion information, the emotion index, and the crime index of the person) for each person ID, or stores information on threshold values used for various determinations, and the like.

In a case in which the processor 11 can generate learning data used for realizing various functions, the memory 12 stores the learning data generated by the processor 11.

Learning for generating the learning data may be performed by using one or more statistical classification techniques. Examples of the statistical classification technique includes, a linear classifier, a support vector machine, a quadratic classifier, a kernel estimation, a decision tree, an artificial neural network, a Bayesian technique and/or network, a hidden Markov model, a binary classifier, a multi-class classifier, a clustering technique, a random forest technique, a logistic regression technique, a linear regression technique, and a gradient boosting technique. However, the statistical classification technique to be used is not limited thereto.

The image sensor 13 includes a charge coupled device (CCD) or a complementary metal oxide semiconductor (CMOS) as an imaging element. The image sensor 13 may include a chip including an image processing circuit for generating data of the captured image by performing known signal processing for image processing on an electrical signal of an object (a person HM) image. The image sensor 13 generates the data of the captured image and outputs the data to the processor 11.

The lens 14 forms, on the image sensor 13, an image of light incident from the monitoring area of the camera C1 (that is, an imaging area).

The lens driving unit 15 controls a focus position of the lens 14 based on a control command output from the processor 11.

The microcontroller 16 is implemented by using a micro controller unit (MCU), and controls emission of a radar to a management area of the camera C1 by the millimeter wave radar 17 based on the control command of the processor 11. The microcontroller 16 performs signal processing such as digital conversion and frequency component analysis on an analog signal output from the millimeter wave radar 17. At this time, the microcontroller 16 extracts a reflection component reflected by the person positioned within an emission range of the radar (that is, within the angle of view of the camera C1) from the reception signal, and further extracts the vital information (for example, information such as heartbeat, pulse, and breathing) on the person included in a reflected wave reflected by the person. The microcontroller 16 outputs a result of the signal processing to the processor 11.

The millimeter wave radar 17 serving as an example of a radar emits a radio wave having a wavelength of 1 mm to 10 mm and receives a reflected wave reflected by an object (for example, a person, or a wall of a building) present in an emission direction. The millimeter wave radar 17 emits the radio wave based on the control executed by the microcontroller 16. The millimeter wave radar 17 outputs the received analog signal to the microcontroller 16.

Figure 3:
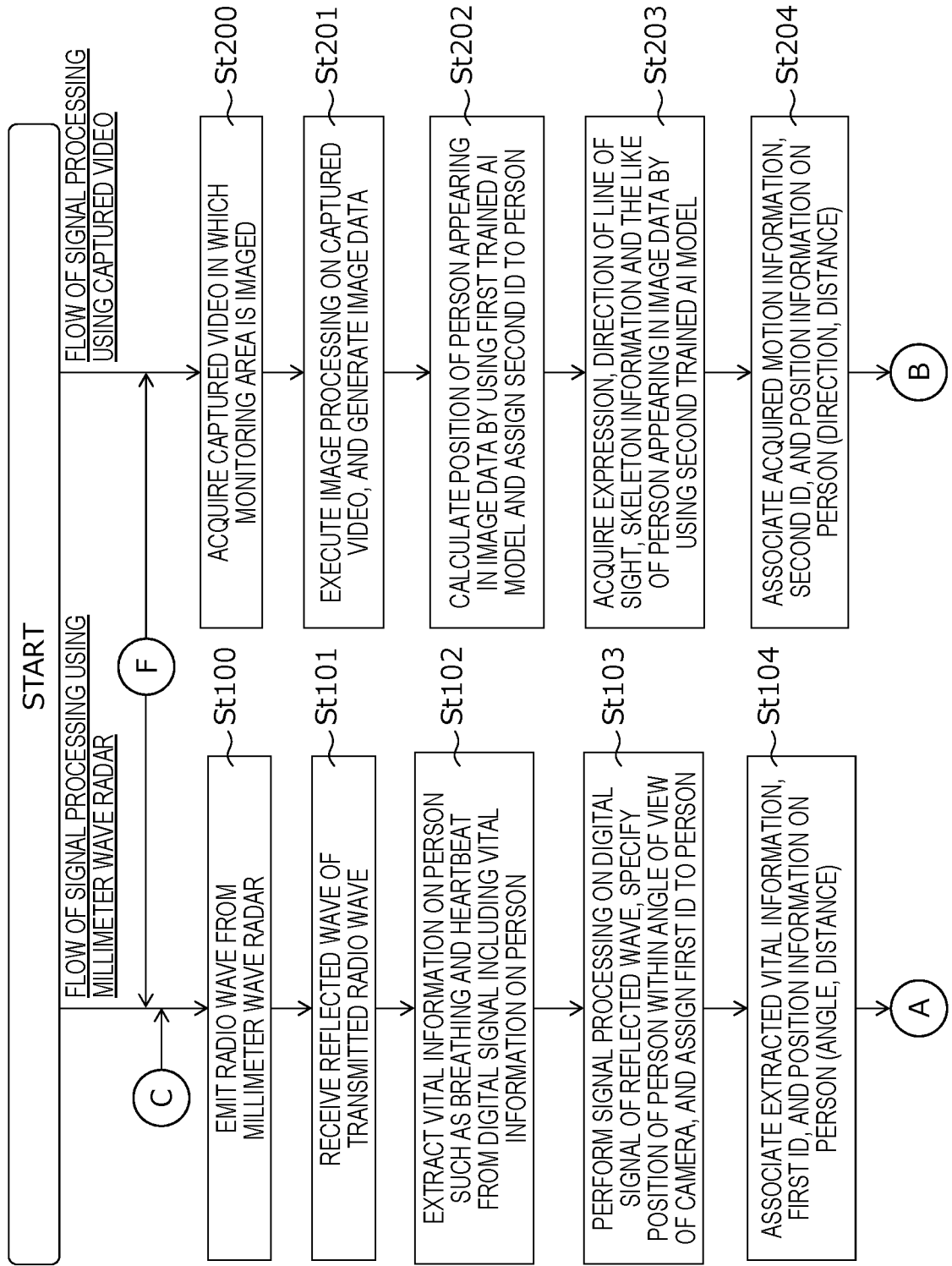
FIG. 3 is a flowchart illustrating an operation procedure example of the suspicious person detection system according to the first embodiment.
Figure 4:
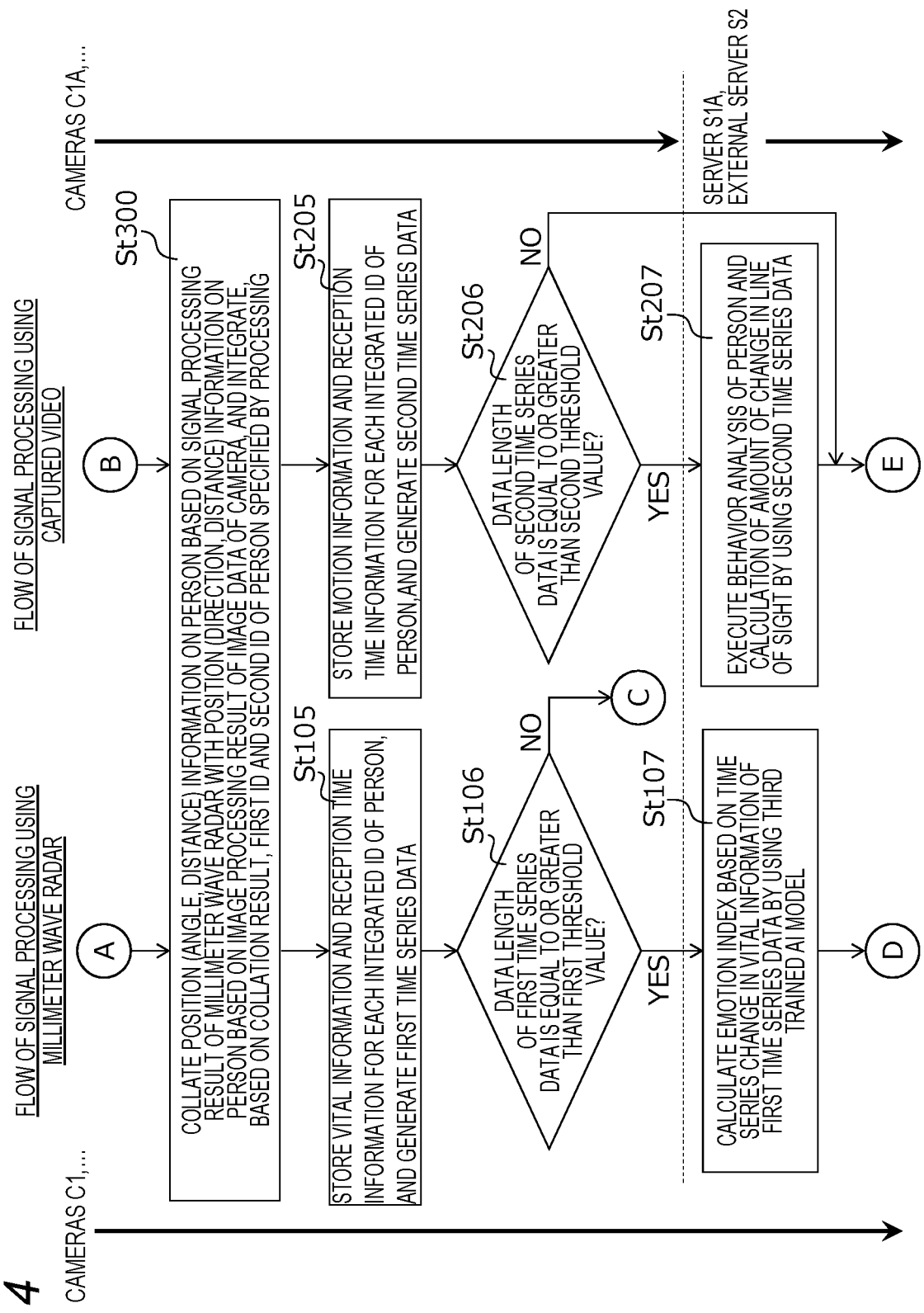
FIG. 4 is a flowchart illustrating the operation procedure example of the suspicious person detection system according to the first embodiment.
Figure 5:
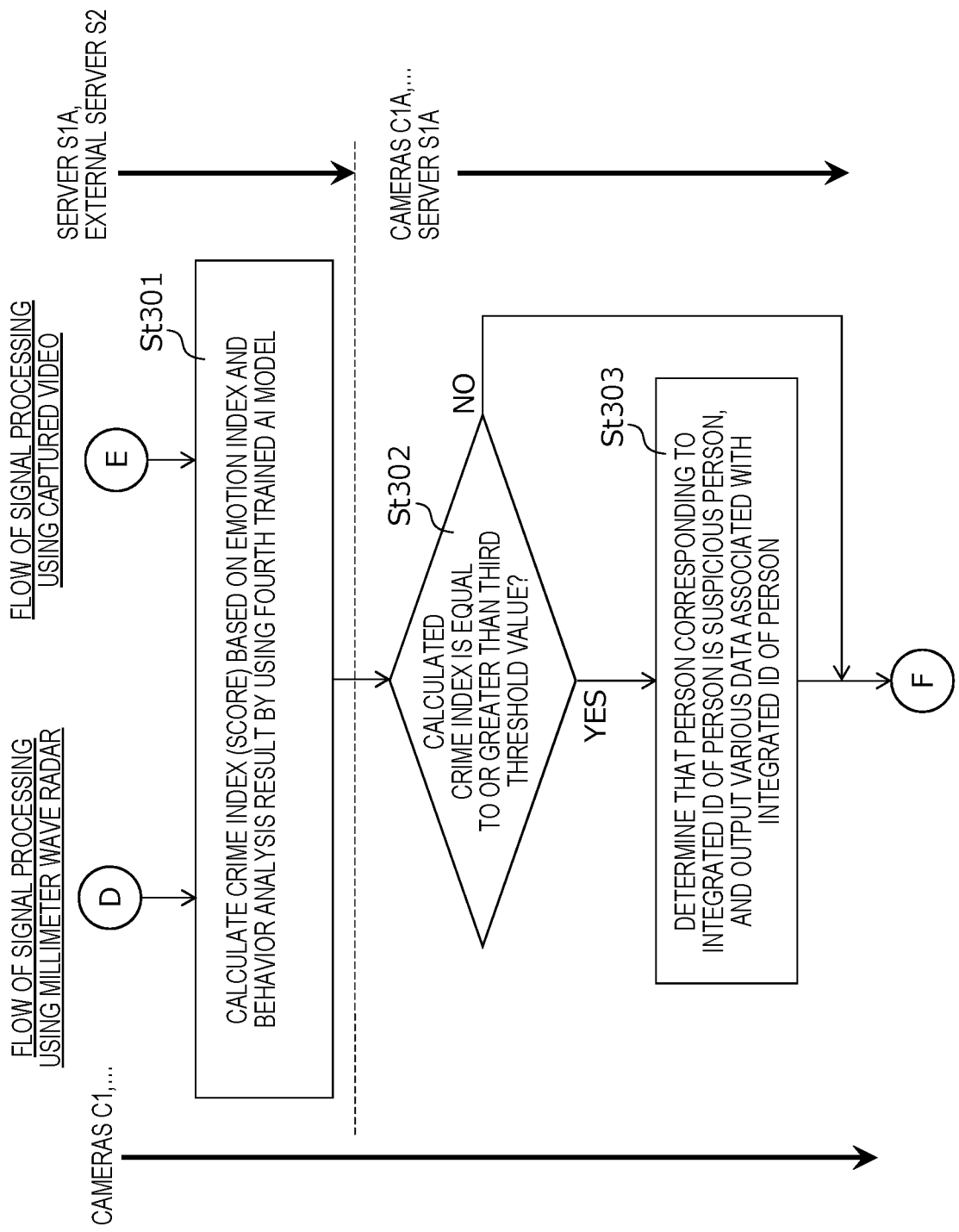
FIG. 5 is a flowchart illustrating the operation procedure example of the suspicious person detection system according to the first embodiment.

Next, an operation procedure example of the suspicious person detection system 100 according to the first embodiment will be described with reference to FIGS. 3 to 5. FIG. 3 is a flowchart illustrating the operation procedure example of the suspicious person detection system 100 according to the first embodiment. FIG. 4 is a flowchart illustrating the operation procedure example of the suspicious person detection system 100 according to the first embodiment. FIG. 5 is a flowchart illustrating the operation procedure example of the suspicious person detection system 100 according to the first embodiment. In the description of FIGS. 3 to 5, in order to make the description easy to understand, an operation procedure example executed by the camera C1 is described, but the other cameras also execute the same operation procedure.

The suspicious person detection system 100 independently executes signal processing of a signal obtained by digitally converting the reflected wave of the radio wave transmitted from the millimeter wave radar 17 and image processing of the captured video (the captured image). First, a processing flow (an operation procedure) of analog signal processing illustrated in steps St100 to St104 will be described.

The camera C1 emits the radio wave toward the monitoring area of the camera C1 by the millimeter wave radar 17 (St100). The camera C1 receives the reflected wave of the emitted radio wave by the millimeter wave radar 17 (ST101). The camera C1 converts the received reflected wave into a digital signal.

The camera C1 performs the signal processing and extracts the vital information on the person (for example, information such as heartbeat, pulse, and breathing) from the digital signal (St102).

The camera C1 specifies (measures) the position (an angle, a distance) (an example of first position information) of the person positioned within the angle of view of the camera C1 (that is, an area corresponding to the angle of view of the camera C1) based on the digital signal including the vital information on the person. The camera C1 assigns a first ID for identifying a person to each person whose position is specified based on the reflected wave of the millimeter wave radar 17 (St103). The distance specified here is a distance from a transmission/reception position of the radio wave of the millimeter wave radar 17 to the person. Similarly, the angle specified here is an angle based on the transmission/reception position of the radio wave of the millimeter wave radar 17.

The camera C1 records the vital information on the person, the position information (the angle, the distance), reception time information on the reflected wave of the radio wave, and the first ID in association with each other (St104). The camera C1 determines, based on a temporal change in position information on a person (an angle, a distance) newly acquired by using each of the digital signals, whether the person is the same person as a person assigned with the first ID. In response to determining that the person is the same person, the camera C1 assigns the same first ID to the position information and the vital information on the person determined to be the same person, and records the same.

Next, an image processing flow (an operation procedure) of the captured image illustrated in steps St200 to St204 will be described.

The camera C1 acquires the captured video in which the monitoring area is imaged (St200). The camera C1 executes the image processing on the captured video, and generates data (that is, image data) of a plurality of captured images (St201). The camera C1 detects persons appearing in the captured image (the image data), and calculates a position (a direction, a distance) (an example of second position information) of each person by using the first trained AI model stored in the learning model memory DB1. The camera C1 assigns a second ID for identifying a person to each person whose position is specified based on the captured image (St202). The distance referred to here is a distance from a light receiving surface of the image sensor 13 of the camera C1 to the person appearing in the captured image. Similarly, the direction is a direction viewed from any reference point set on the light receiving surface of the image sensor 13 of the camera C1.

The camera C1 analyzes and acquires the motion information such as the posture, and a direction of the line of sight of the person based on the skeleton information on each of the persons appearing in the captured image by using the second trained AI model stored in the learning model memory DB1 (St203).

The camera C1 records the motion information on the person, the position information (the direction, the distance), imaging time information on the captured image, and the second ID in association with each other (St204). The camera C1 determines, based on a temporal change in position information (a direction, a distance) on a person, motion information on the person, and the like newly acquired by using each of the plurality of captured images, whether the person is the same person as a person assigned with the second ID. In response to determining that the person is the same person, the camera C1 assigns the same second ID to the position information and the motion information on the person determined to be the same person, and records the same.

The camera C1 collates the position (the angle, the distance) information on the person associated with the first ID with the position (the direction, the distance) information on the person associated with the second ID. In response to determining that the person associated with the first ID and the person associated with the second ID are the same person based on a collation result, the camera C1 integrates the first ID and the second ID assigned to the person determined to be the same person (St300). The camera C1 may integrate the first ID and the second ID into one of the IDs (that is, the first ID and the second ID), or may assign a new ID (a third ID). In the following description, an ID after being integrated is referred to as an integrated ID in order to make the description easy to understand.

A calculation processing flow (an operation procedure) of the emotion index illustrated in each of steps St105 to St107 will be described.

The camera C1 stores the vital information on the person and the reception time information in the memory 12 for each integrated ID, and generates the first time series data in which the vital information on the person is rearranged based on the reception time information (St105). The camera C1 determines whether a data length of the generated first time series data is equal to or greater than a first threshold value (for example, 30 seconds, 45 seconds, or 60 seconds) (an example of a first predetermined time) (St106).

In response to determining that the data length of the first time series data is equal to or greater than the first threshold value in the processing of step St106 (St106, YES), the camera C1 analyzes a time series change (for example, a variation of intervals of the heartbeat, the breathing, and the pulse) in the vital information included in the first time series data by using the third trained AI model. The camera C1 calculates the emotion index of the person corresponding to the vital information based on the time series change in the analyzed vital information (St107). The emotion index referred to here may be a known index such as a circular ring model of Russel.

On the other hand, in response to determining that the data length of the first time series data is not equal to or greater than the first threshold value in the processing of step St106 (St106, NO), the camera C1 proceeds to the processing of step St100, and repeats the processing of generating the first time series data until the data length of the first time series data becomes a length sufficient for calculating the emotion index (that is, equal to or greater than the first threshold value).

Next, a behavior analysis processing flow (an operation procedure) of stability of the posture, the amount of change in the line of sight, and the like illustrated in each of steps St205 to St207 will be described.

The camera C1 stores the motion information on the person and the reception time information in the memory 12 for each integrated ID, and generates the second time series data in which the motion information on the person is rearranged based on the reception time information (St205). The camera C1 determines whether a data length of the generated second time series data is equal to or greater than a second threshold value (for example, 20 seconds, 30 seconds, or 40 seconds) (an example of a second predetermined time) (St206).

In response to determining that the data length of the second time series data is equal to or greater than the second threshold value in the processing of step St206 (St206, YES), the camera C1 executes behavior analysis processing on the stability of the posture, the amount of change in the line of sight, and the like of the person corresponding to the second time series data based on the motion information included in the second time series data (St207).

On the other hand, in response to determining that the data length of the second time series data is not equal to or greater than the second threshold value in the processing of step St206 (St206, NO), the camera C1 proceeds to the processing of step St301, and repeats the processing of generating the second time series data until the data length of the second time series data becomes a length sufficient for the behavior analysis processing (that is, equal to or greater than the second threshold value).

The camera C1 analyzes each of the calculated emotion index and the behavior analysis result and calculates the crime index (score) of the person by using the fourth trained AI model stored in the learning model memory DB1 (St301). Here, as an example, the crime index is described as a numerical value (score) in a range of "0 to 100", but the crime index may be a numerical value (score) in a range of "0 to 1", and may be an index such as "S", "A", or "B".

The camera C1 determines whether the calculated crime index is equal to or greater than a third threshold value (for example, 85, 90, or 95) (an example of a threshold value) (St302). The third threshold value may be set to any value by the user.

In response to determining that the crime index (score) is equal to or greater than the third threshold value in the processing of step St302 (St302, YES), the camera C1 determines that the person corresponding to the integrated ID of the person is a suspicious person, and outputs various data associated with the integrated ID (St303). The various data referred to here is, for example, the face image of the person, the captured video data in which the person is imaged, the first time series data, the second time series data, the emotion index, the behavior analysis result, the imaging time information, and an installation position of the camera C1. In the processing of step St303, the camera C1 may further associate and output various data associated with respective integrated IDs of other persons appearing in the same captured image and not determined to be suspicious persons.

On the other hand, in response to determining that the crime index is not equal to or greater than the third threshold value in the processing of step St302 (St302, NO), the camera C1 proceeds to the processing of step St100 or step St200.

As described above, each of the cameras C1, . . . in the first embodiment acquires the vital information and the motion information on the person appearing in the monitoring area of the camera and analyzes the emotion index, the behavior, and the like of the person corresponding to the acquired data based on the time series data of the acquired vital information (the first time series data) and the time series data of the motion information (the second time series data) by using various trained AI models (specifically, each of the first to fourth trained AI models). Each of the cameras C1, . . . can determine whether an alarm notification relating to the person is to be issued by calculating the crime index (score) indicating the degree of the sign of the crime based on the analysis result (specifically, the emotion index and the behavior analysis result of the person).

Figure 6:
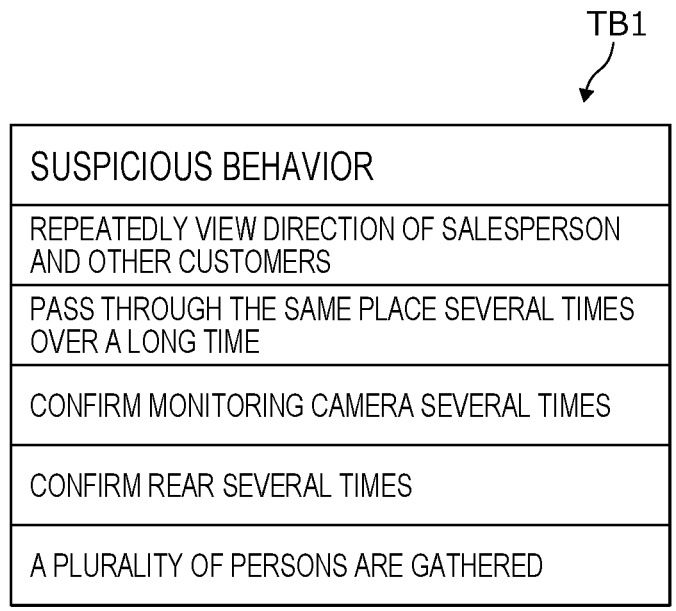
FIG. 6 is a table illustrating an example of a suspicious behavior.

Here, an example of a suspicious behavior used for calculating the crime index (score) and determining a suspicious person will be described with reference to FIG. 6. FIG. 6 is a table TB1 illustrating an example of the suspicious behavior.

It is needless to say that the example of the suspicious behavior illustrated in FIG. 6 is an example, and the suspicious behavior is not limited thereto. Here, an example in which determining processing of the suspicious behavior is executed by the camera C1 is described, but the determining processing of the suspicious behavior may be executed by the server S1.

The Table TB1 illustrates a list of the suspicious behavior examples for determining whether a person corresponding to the second time series data performs a suspicious behavior based on the analysis result of the second time series data analyzed by using the fourth trained AI model. Although not illustrated in the table TB1 illustrated in FIG. 6, a specific condition (a threshold value) such as "number of times of passage" and "time of passing through the same place" may be set as an additional condition in a condition for determining a behavior to be a suspicious behavior, for example, "pass through the same place several times over a long time".

The camera C1 analyzes the second time series data by using the fourth trained AI model, and increases a value of the crime index (score) in response to determining that the person corresponding to the second time series data performs a suspicious behavior such as "repeatedly view direction of salesperson and the other customers", "pass through the same place several times over a long time", "confirm monitoring camera several times", "confirm rear several times", or "a plurality of persons are gathered" illustrated in the table TB1.

As a result of analyzing the first time series data by using the third trained AI model, the camera C1 increases the crime index (score) in response to determining that an emotion of a person corresponding to the first time series data corresponds to an emotion related to a crime (for example, "tension", "stress", and "irritation").

Figure 7:
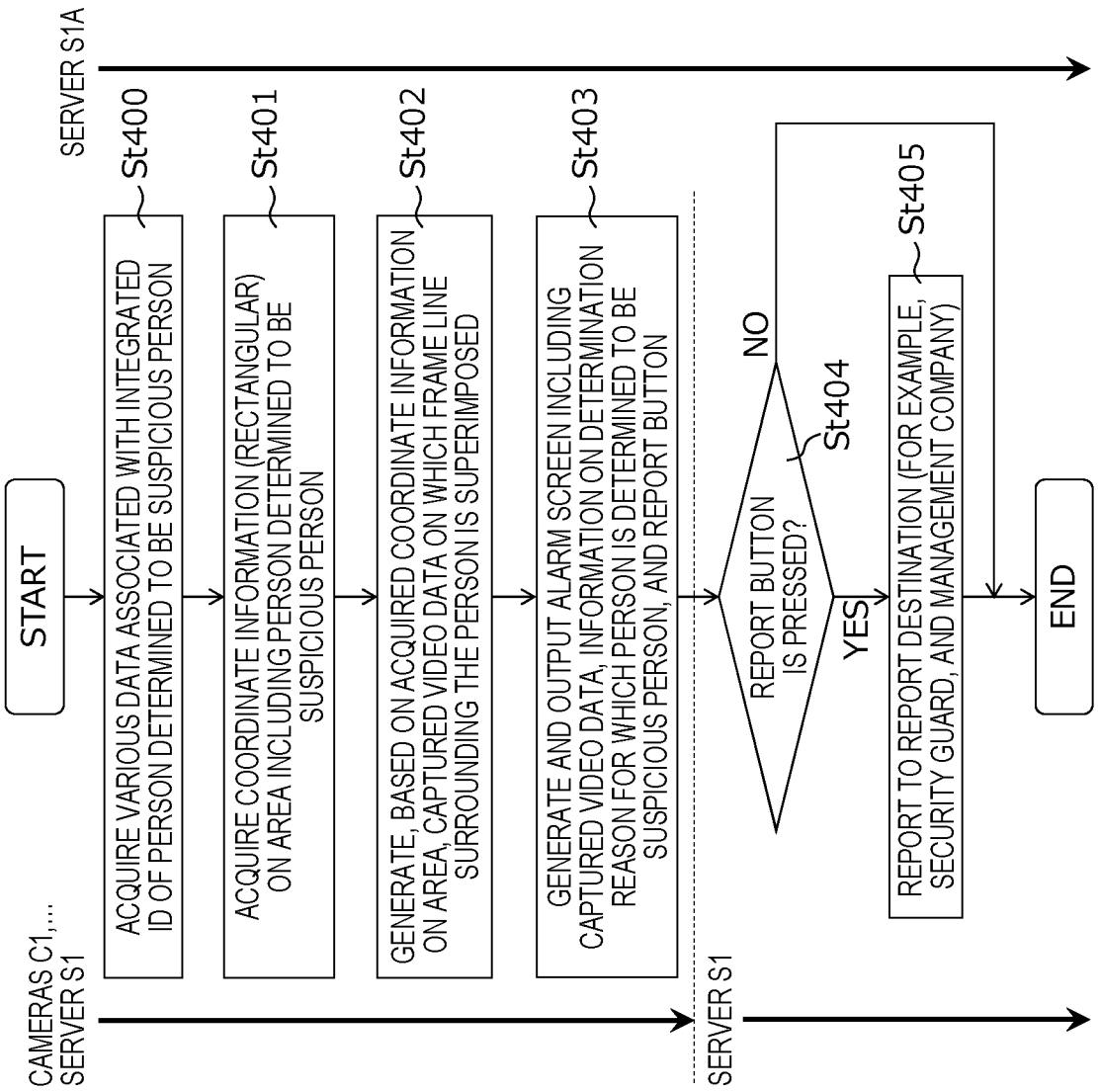
FIG. 7 is a flowchart illustrating an operation procedure example of a server according to the first embodiment.

Next, an operation procedure of the server S1 will be described with reference to FIG. 7. FIG. 7 is a flowchart illustrating an operation procedure example of the server S1 in the first embodiment. Processing of steps St400 to St403 illustrated in FIG. 7 may be executed by each of the plurality of cameras C1, . . . .

The server S1 acquires various data (for example, the face image of the person determined to be a suspicious person, the captured video data in which the person is imaged, the first time series data, the second time series data, the emotion index, the behavior analysis result, the imaging time information, and the installation position of the camera) associated with the integrated ID of the person determined to be a suspicious person (St400). In the processing of step St400, the server S1 may acquire the various data associated with the respective integrated IDs of the other persons appearing in the same captured image as the person determined to be a suspicious person and not determined to be suspicious persons.

Here, an example in which various data is acquired from each of the cameras C1, . . . is described, but in a case in which the processing of step St303 is executed by the server S1, various data recorded in the memory 22 or the database DB2 in the server S1 and associated with the integrated ID of the person determined to be a suspicious person may be referred to. It is needless to say that in a case in which the processing of step St303 is executed by the external server S2 as in a suspicious person detection system 100B described in a second modification of the first embodiment described later, the server S1 may acquire the various data associated with the integrated ID of the person determined to be a suspicious person from the external server S2.

The server S1 acquires coordinate information on an area including the person determined to be a suspicious person based on the various data (St401). The coordinate information on the area acquired here is a coordinate of a substantially rectangular area including the person determined to be a suspicious person in the angle of view of each of the cameras C1, . . . . The acquired area may not be an area including a specific part such as a whole body or an upper half body of the person, and may be an area including a part of the person appearing in captured images imaged by the cameras C1, . . . .

Based on the acquired coordinate information on the area, the server S1 generates captured video data in which a frame line surrounding at least a part of the area of the person is superimposed on the captured image (the image data) in which the person is imaged (St402). The person superimposed with the frame line is not limited to the person determined to be a suspicious person.

For example, in a case in which the server S1 acquires the various data associated with the respective integrated IDs of the other persons appearing in the same captured image as the person determined to be a suspicious person and not determined to be suspicious persons, the server S1 may acquire coordinate information on each area including each of the other persons and superimpose a frame line surrounding each of the other persons. Here, the frame line surrounding the person determined to be a suspicious person (an example of a first frame line) and the frame line surrounding the other person not determined to be a suspicious person (an example of a second frame line) are different in, for example, a color of the frame line, a line type of the frame line, and a thickness of the frame line. Accordingly, the user can easily determine whether each of the persons appearing in the captured video (the captured image) is a suspicious person based on the color, the line type, the line thickness, and the like of the superimposed frame line.

The server S1 generates the alarm screen (see FIGS. 8 and 9) including the generated captured video data, information on a determination reason for which the person is determined to be a suspicious person (for example, information on the emotion index, the behavior analysis result, and the suspicious behavior), and a report button (see FIGS. 8 and 9) for reporting to the preset report destination, and outputs (displays) the alarm screen to the monitor MN (St403).

The server S1 determines whether the report button is pressed by a user operation (St404). Specifically, in a case in which the report button on the alarm screen is selected (pressed) by the user operation, the operation unit 23 generates a control command for requesting the report to the set report destination and outputs the control command to the server S1. The server S1 determines, based on the control command output from the operation unit 23, whether the report button is pressed by the user operation.

In response to determining that the report button is pressed by the user operation in the processing of step St404, (St404, YES), the server S1 generates and transmits (that is, reports) notification information indicating that a suspicious person is detected to the set report destination (for example, the security guard terminal TP1 possessed by the security guard, the management company) (St405). Here, the server S1 may transmit the notification information and the alarm notification or various data to the report destination.

On the other hand, in response to determining that the report button is not pressed by the user operation in the processing of step St404 (St404, NO), the server S1 ends the operation procedure illustrated in FIG. 7.

Figure 8:
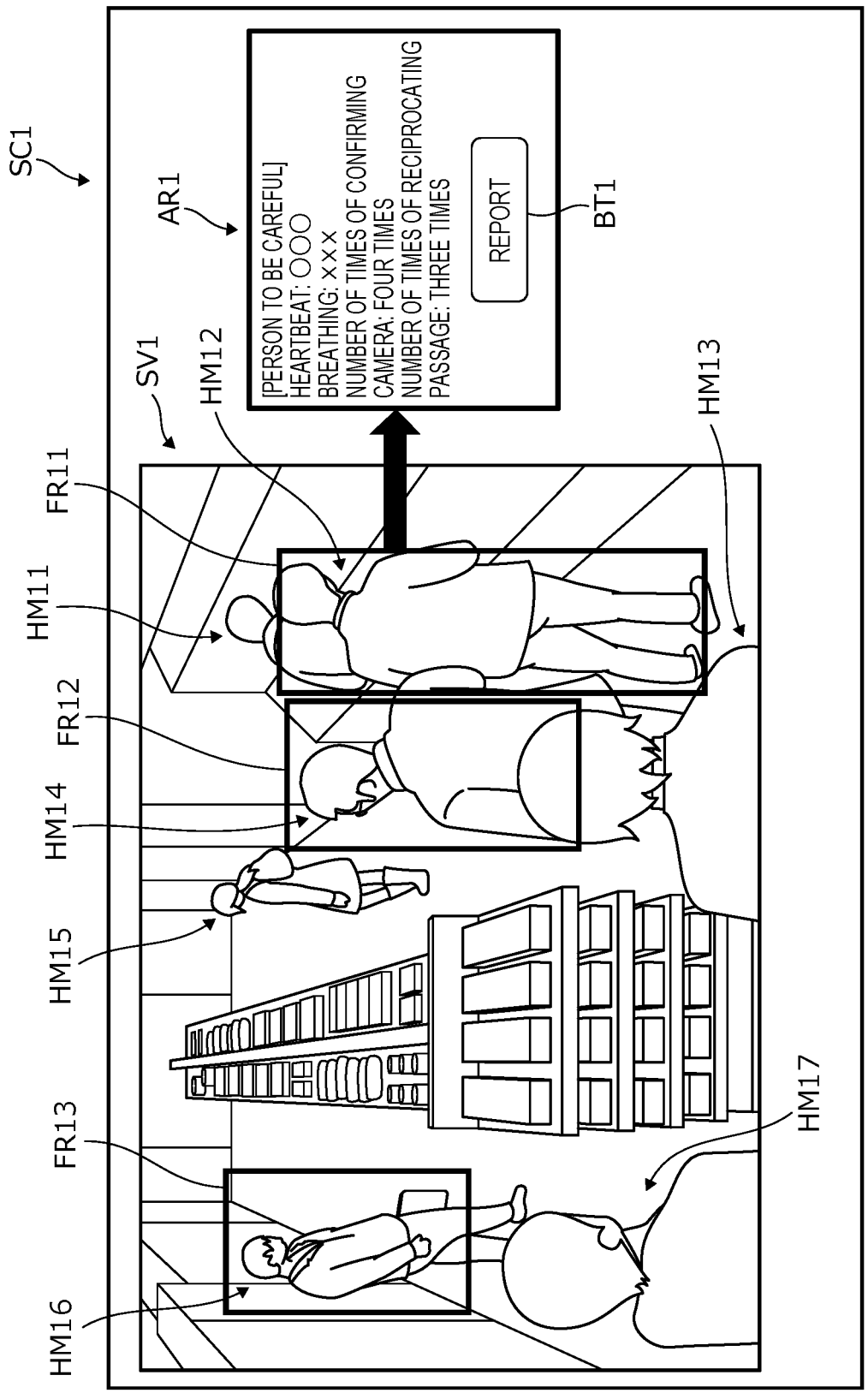
FIG. 8 is a diagram illustrating an example of an alarm screen.

An alarm screen SC1 will be described with reference to FIG. 8. FIG. 8 is a diagram illustrating an example of the alarm screen SC1. It is needless to say that determination reason information AR1 illustrated in the alarm screen SC1 illustrated in FIG. 8 is an example, and the determination reason information AR1 is not limited thereto.

The alarm screen SC1 is generated by the server S1 and is output to and displayed on the monitor MN. The alarm screen SC1 includes a captured video display area SV1, the determination reason information AR1, and a report button BT1.

The captured video display area SV1 is an area for displaying the captured video in which the person determined to be a suspicious person is imaged. The alarm screen SC1 may display the captured image in which the person determined to be a suspicious person is imaged in the captured video display area SV1. The captured video displayed in the captured video display area SV1 is displayed in a manner that the first frame line is superimposed on the person determined to be a suspicious person, and the second frame line is superimposed on the person not determined to be a suspicious person.

The captured video display area SV1 in the alarm screen SC1 illustrated in FIG. 8 displays a captured video in which seven persons HM11, HM12, HM13, HM14, HM15, HM16, and HM17 are imaged. The person HM12 is a person determined to be a suspicious person, and a red frame line FR11 (the first frame line) is superimposed thereon. Each of the persons HM14 and HM16 is a person not determined to be a suspicious person, and a yellow frame line FR12 (the second frame line) is superimposed on the person HM14, and a yellow frame line FR13 (the second frame line) is superimposed on the person HM16. A person who is not superimposed with neither the first frame line nor the second frame line means a person who is not subjected to the determining processing of whether the person is a suspicious person for a reason that a data length of time series data is less than a length necessary for the determination (specifically, the first time series data is not equal to or greater than the first threshold value, and the second time series data is not equal to or greater than the second threshold value).

Accordingly, based on the alarm screen SC1, the user can grasp at a glance that only the person HM12 is a person determined to be a suspicious person, and can grasp at a glance that each of the persons HM14 and HM16 is a person not determined to be a suspicious person at the current time.

The determination reason information AR1 includes information such as a condition under which a person is determined to be a suspicious person (that is, information or the like on various data that causes a crime index (score) to be increased in calculation of the crime index (score)) or a reason for which a person is determined to be a suspicious person. The determination reason information AR1 illustrated in FIG. 8 includes, as an example, two pieces of vital information of "heartbeat: ∘∘∘" and "breathing: xxx" and two pieces of suspicious behavior information of "number of times of confirming camera: four times" and "number of times of reciprocating passage: three times", which are related to the person HM12. The determination reason information AR1 may include, as other information, information such as "determination score: 80" which is a final determination result (a crime index).

The report button BT1 is a button for reporting to the preset report destination when the report button BT1 is pressed (selected) by the user operation. In response to determining that the report button BT1 is pressed (selected) by the user operation based on the control command output from the operation unit 23, the processor 21 in the server S1 issues a notification (a report) indicating that a suspicious person is detected to the preset report destination.

Figure 9:
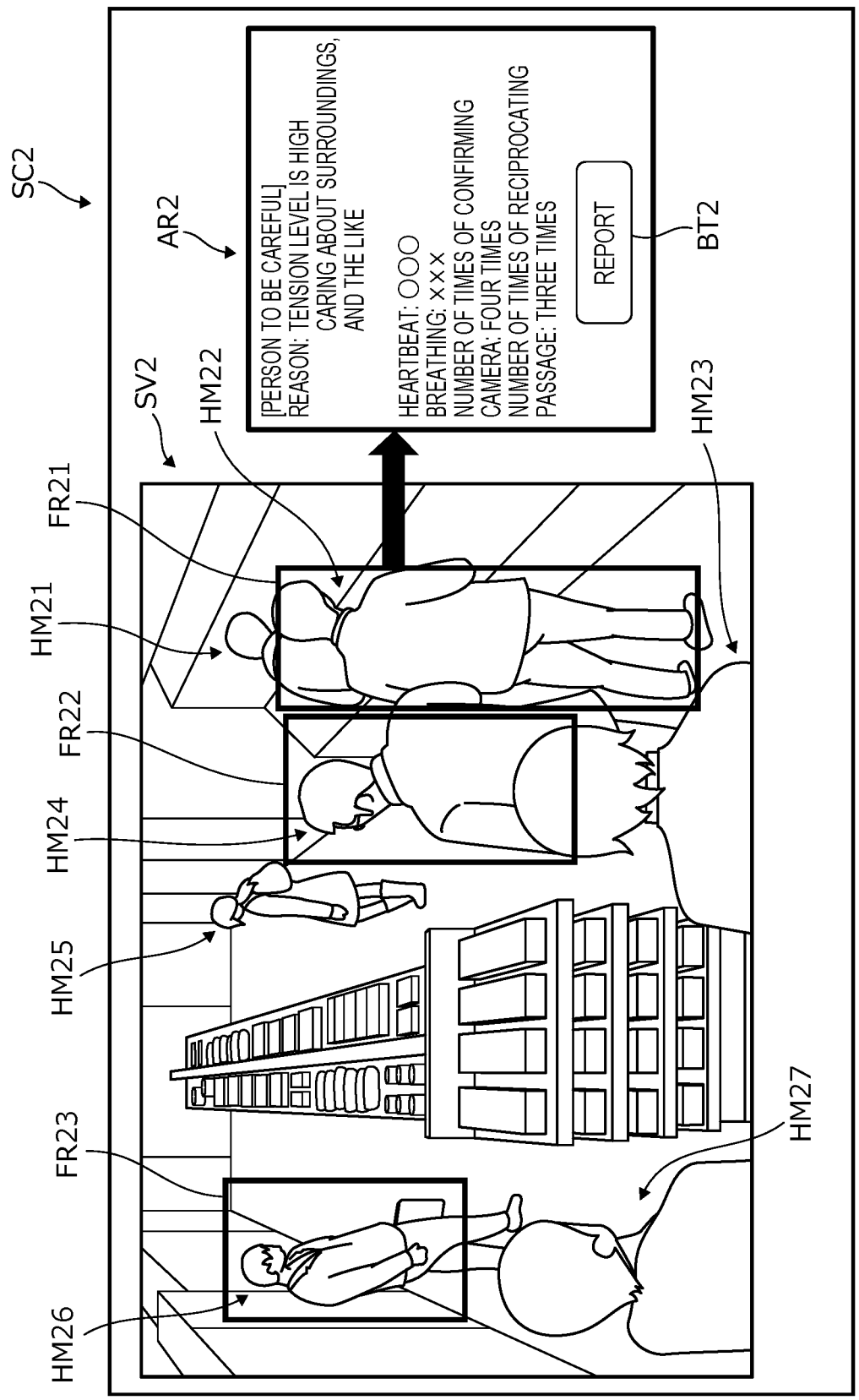
FIG. 9 is a diagram illustrating an example of the alarm screen.

An alarm screen SC2 will be described with reference to FIG. 9. FIG. 9 is a diagram illustrating an example of the alarm screen SC2. It is needless to say that determination reason information AR2 illustrated in the alarm screen SC2 illustrated in FIG. 9 is an example, and the determination reason information AR2 is not limited thereto.

The alarm screen SC2 is generated by the server S1 and is output to and displayed on the monitor MN. The alarm screen SC2 includes a captured video display area SV2, the determination reason information AR2, and a report button BT2.

The captured video display area SV2 is an area for displaying the captured video in which the person determined to be a suspicious person is imaged. The alarm screen SC2 may display a captured image in which the person determined to be a suspicious person is imaged in the captured video display area SV2. The captured video displayed in the captured video display area SV2 is displayed in a manner that the first frame line is superimposed on the person determined to be a suspicious person, and the second frame line is superimposed on the person not determined to be a suspicious person.

The captured video display area SV2 in the alarm screen SC2 illustrated in FIG. 9 displays a captured video in which seven persons HM21, HM22, HM23, HM24, HM25, HM26, and HM27 are imaged. The person HM22 is a person determined to be a suspicious person, and a red frame line FR21 (the first frame line) is superimposed thereon. Each of the persons HM24 and HM26 is a person not determined to be a suspicious person, and a yellow frame line FR22 (the second frame line) is superimposed on the person HM24, and a yellow frame line FR23 (the second frame line) is superimposed on the person HM26. A person who is not superimposed with neither the first frame line nor the second frame line means a person who is not subjected to the determining processing of whether the person is a suspicious person for a reason that a data length of time series data is less than a length necessary for the determination (specifically, the first time series data is not equal to or greater than the first threshold value, and the second time series data is not equal to or greater than the second threshold value).

Accordingly, based on the alarm screen SC2, the user can grasp at a glance that only the person HM22 is a person determined to be a suspicious person, and can grasp at a glance that each of the persons HM24 and HM26 is a person not determined to be a suspicious person at the current time.

The determination reason information AR2 includes information such as a condition under which a person is determined to be a suspicious person (that is, information or the like on various data that causes a crime index (score) to be increased in calculation of the crime index (score)) or a reason for which a person is determined to be a suspicious person. The determination reason information AR2 illustrated in FIG. 9 includes, as an example, two reasons for which the person HM22 is determined to be a suspicious person of "tension level is high", and "caring about surroundings", and two pieces of vital information of "heartbeat: ∘∘∘" and "breathing: xx" and two pieces of suspicious behavior information of "number of times of confirming camera: four times" and "number of times of reciprocating passage: three times", which are related to the person HM22. The determination reason information AR2 may include information related to other emotion indices such as "tension degree: ΔΔΔ" and "attacking property: □□□", and information such as "determination score: 80" which is a final determination result (a crime index).

The report button BT2 is a button for reporting to the preset report destination when the report button BT2 is pressed (selected) by the user operation. In response to determining that the report button BT2 is pressed (selected) by the user operation based on the control command output from the operation unit 23, the processor 21 in the server S1 issues a notification (a report) indicating that a suspicious person is detected to the preset report destination.

First Modification of First Embodiment

The suspicious person detection system 100 according to the first embodiment described above shows an example in which whether a person imaged by each of the cameras C1, . . . is a suspicious person is determined. A suspicious person detection system 100A (an example of the suspicious person alarm notification system) according to the first modification of the first embodiment will be described with an example in which whether a person imaged by each of cameras C1A, . . . is a suspicious person is determined by a server S1A.

Figure 10:
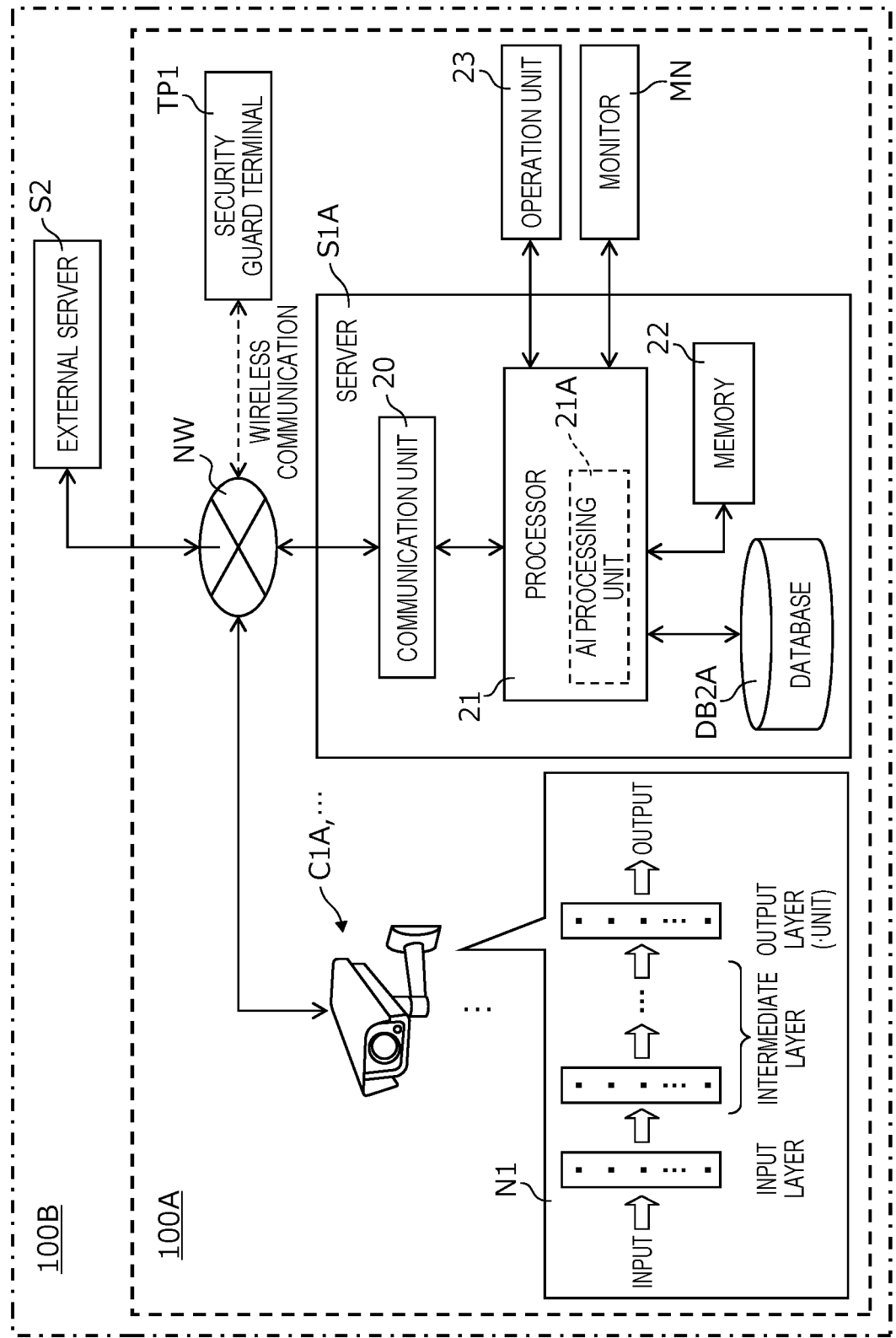
FIG. 10 is a block diagram illustrating a system configuration example of a suspicious person detection system according to a first modification of the first embodiment and a system configuration example of a suspicious person detection system according to a second modification of the first embodiment.

An internal configuration of the suspicious person detection system 100A according to the first modification of the first embodiment will be described with reference to FIG. 10. FIG. 10 is a block diagram illustrating an internal configuration example of the suspicious person detection system 100A according to the first modification of the first embodiment and an internal configuration example of the suspicious person detection system 100B according to the second modification of the first embodiment. In the internal configuration of the suspicious person detection system 100A according to the first modification of the first embodiment illustrated in FIG. 10, the same components as those of the suspicious person detection system 100 according to the first embodiment are denoted by the same reference numerals, and descriptions thereof are omitted.

Each of the cameras C1A, . . . in the first modification of the first embodiment generates the first time series data, and transmits the first time series data to the server S1A in response to determining that the data length of the first time series data is equal to or greater than the first threshold value. Similarly, each of the cameras C1A, in the first modification of the first embodiment generates the second time series data, and transmits the second time series data to the server S1A in response to determining that the data length of the second time series data is equal to or greater than the second threshold value. Each of the cameras C1A, . . . may not store the third trained AI model and the fourth trained AI model in the learning model memory DB1.

The server S1A in the first modification of the first embodiment stores the third trained AI model and the fourth trained AI model in a database DB2A, and analyzes the first time series data and the second time series data transmitted from each of the plurality of cameras C1A, . . . . The server S1A calculates the crime index (score) of the person corresponding to the first time series data and the second time series data based on the analysis result obtained by using the fourth trained AI model, and determines whether the calculated crime index (score) is equal to or greater than the third threshold value. In response to determining that the calculated crime index (score) is equal to or greater than the third threshold value (that is, the person is a suspicious person) as a result of the determination, the server S1A generates the alarm screen based on various data associated with the integrated ID of the person and outputs the alarm screen to the monitor MN.

Here, a correspondence relation between the operation procedure example of the suspicious person detection system 100 according to the first embodiment illustrated in FIGS. 3 to 5 and FIG. 7 and an operation procedure example of the suspicious person detection system 100A according to the first modification of the first embodiment will be described with reference to FIG. 11. FIG. 11 is a table TB2 illustrating a correspondence relation between the operation procedure examples illustrated in FIGS. 3 to 5 and FIG. 7 and an operation procedure example of the suspicious person detection system according to each embodiment.

In the suspicious person detection system 100A according to the first modification of the first embodiment, among the operation procedure example of the suspicious person detection system 100 according to the first embodiment illustrated in FIGS. 3 to 5 and FIG. 7, the processing of steps St100 to St106, steps St200 to St206, and step St300 is executed by each of the cameras C1A, . . . , and the processing of step St107, step St207, steps St301 to St303, and steps St400 to St405 is executed by the server S1A.

As described above, the suspicious person detection system 100A according to the first modification of the first embodiment can reduce, by causing the server S1A to execute the calculation processing of the crime index (score) by using the trained AI model, a processing load based on the calculation processing of the crime index (score) executed by each of the plurality of cameras C1A, . . . .

Second Modification of First Embodiment

The suspicious person detection system 100 according to the first embodiment described above shows an example in which whether a person imaged by each of the cameras C1, . . . is a suspicious person is determined. The suspicious person detection system 100B (an example of the suspicious person alarm notification system) according to the second modification of the first embodiment will be described with an example in which whether a person imaged by each of cameras C1A, . . . is a suspicious person is determined by the external server S2.

An internal configuration of the suspicious person detection system 100B according to the second modification of the first embodiment will be described with reference to FIG. 10.

Each of the cameras C1A, . . . in the second modification of the first embodiment is communicably connected to the server 51A and the external server S2 via the network NW, and transmits and receives data. Each of the cameras C1A, . . . generates the first time series data, and transmits the first time series data to the external server S2 in response to determining that the data length of the first time series data is equal to or greater than the first threshold value. Similarly, each of the cameras C1A, . . . in the second modification of the first embodiment generates the second time series data, and transmits the second time series data to the external server S2 in response to determining that the data length of the second time series data is equal to or greater than the second threshold value. Each of the cameras C1A, . . . may not store the third trained AI model and the fourth trained AI model in the learning model memory DB1.

The external server S2 in the second modification of the first embodiment is communicably connected to each of the plurality of cameras C1A, . . . and the server S1A via the network NW, and transmits and receives data. The external server S2 stores a trained AI model corresponding to each of the third trained AI model and the fourth trained AI model, and analyzes the first time series data and the second time series data transmitted from each of the plurality of cameras C1A, . . . . The external server S2 calculates the crime index (score) of the person corresponding to the first time series data and the second time series data based on an analysis result, and transmits the analysis result to the cameras C1A, . . . which are transmission sources of the data. Each of the cameras C1A, . . . determines whether the calculated crime index (score) is equal to or greater than the third threshold value. In response to determining that the calculated crime index (score) is equal to or greater than the third threshold value (that is, the person is a suspicious person) as a result of the determination, various data associated with the integrated ID of the person is transmitted to the server S1A. The external server S2 may include a dedicated server for each trained AI model, and may be implemented by a plurality of servers.

Here, a correspondence relation between the operation procedure example of the suspicious person detection system 100 according to the first embodiment illustrated in FIGS. 3 to 5 and FIG. 7 and the operation procedure example of the suspicious person detection system 100B according to the second modification of the first embodiment will be described with reference to FIG. 11.

In the suspicious person detection system 100B according to the second modification of the first embodiment, among the operation procedure example of the suspicious person detection system 100 according to the first embodiment illustrated in FIGS. 3 to 5 and FIG. 7, the processing of steps St100 to St106, steps St200 to St206, and step St300 and St302 to St303 is executed by each of the cameras C1A, . . . , the processing of step St107, step St207, and step St301 is executed by the external server S2, and the processing of steps St400 to St405 is executed by the server S1A.

As described above, the suspicious person detection system 100B according to the second modification of the first embodiment can reduce, by causing the external server S2 to execute the calculation processing of the crime index (score) by using the trained AI model, a processing load based on the calculation processing of the crime index (score) executed by each of the plurality of cameras C1A, . . . .

As described above, the suspicious person detection system 100 according to the first embodiment includes one or more cameras C1, . . . and the server S1, the suspicious person detection system 100A according to the first modification of the first embodiment includes one or more cameras C1A, . . . and the server S1A, the cameras C1, . . . and the cameras C1A, . . . each include the artificial intelligence and the millimeter wave radar 17 (an example of a radar) and image the person, and the server S1 and the server S1A are capable of communicating with the cameras C1, . . . or the cameras C1A, . . . . The cameras C1, . . . or the cameras C1A, . . . each receive the signal (the radio wave) emitted by the millimeter wave radar 17 and reflected from the object (for example, a person, or a wall of a building) present in the radar emission direction, extract the vital information on the person included in the signal, acquire, by using the artificial intelligence, the motion information on the person from the captured image obtained by capturing an image of the person, calculate the crime index (an example of the index) indicating the suspicious person likelihood of the person based on the vital information and the motion information on the person, and transmit, to the server S1 or the server S1A respectively, the person information related to the person in which the vital information and the motion information on the person are associated with each other in response to determining that the crime index is equal to or greater than the third threshold value (an example of the threshold value). The server S1 outputs, based on the various data (an example of the person information) transmitted from the cameras C1, . . . , the alarm notification (an example of the alarm) indicating that a suspicious person is detected, and the server S1A outputs, based on the various data (an example of the person information) transmitted from the cameras C1A, . . . , the alarm notification (an example of the alarm) indicating that a suspicious person is detected. The computer referred to here refers to, for example, the cameras C1, . . . or the cameras C1A, . . . .

Accordingly, the suspicious person detection system 100 according to the first embodiment or the suspicious person detection system 100A according to the first modification of the first embodiment can calculate the crime index (score) indicating the probability of executing a crime based on the emotion of the person (for example, a tension state, a stress state, and an excitement state) and the motion of the person based on the vital information and the motion information on the person. Further, the suspicious person detection system 100 or 100A can notify the user of the alarm indicating that a suspicious person is detected in response to determining that the person in the angle of view of the camera is a suspicious person who is likely to execute the crime based on the calculated crime index (score). Therefore, the suspicious person detection system 100 or 100A is capable of more efficiently detect a suspicious person with a sign of a crime and efficiently supporting preventing of occurrence of the crime.

As described above, the cameras C1, . . . in the suspicious person detection system 100 according to the first embodiment or the cameras C1A, . . . in the suspicious person detection system 100A according to the first modification of the first embodiment each calculate the emotion index of the person based on the vital information by using the artificial intelligence, acquire the behavior analysis result of the person (an example of the behavior analysis information) based on the motion information, and calculate the crime index (score) based on the emotion index and the behavior analysis information. Accordingly, the suspicious person detection system 100 according to the first embodiment or the suspicious person detection system 100A according to the first modification of the first embodiment can calculate the crime index (score) indicating the probability of executing the crime based on the emotion index of the person (for example, an emotion such as a tension state, a stress state, an excitement state, and an attacking property) and the motion information on the person based on the emotion index and the behavior analysis result of the person. Therefore, the suspicious person detection system 100 or 100A can more efficiently detect, based on the crime index (score) calculated by using the emotion index of the person and the motion information on the person, the suspicious person with a sign of a crime, and can efficiently support preventing of occurrence of the crime.

As described above, the cameras C1, . . . in the suspicious person detection system 100 according to the first embodiment or the cameras C1A, . . . in the suspicious person detection system 100A according to the first modification of the first embodiment each acquire the first position information on the person based on the signal (the radio wave), generate, based on the first position information, the first time series data in which the vital information on the person is arranged in time series, acquire the second position information on the person based on the position of the person appearing in the captured image, generate, based on the second position information, the second time series data in which the motion information on the person is arranged in time series, calculate the emotion index based on the first time series data, and acquire the behavior analysis information by executing the behavior analysis processing on the stability of the posture, the amount of change in the line of sight, and the like based on the second time series data. Accordingly, the suspicious person detection system 100 according to the first embodiment or the suspicious person detection system 100A according to the first modification of the first embodiment can generate, based on the change in the position information on the person, the first time series data in which the acquired vital information is arranged in time series and the second time series data in which the motion information is arranged in time series. Therefore, based on the generated first time series data and second time series data, the suspicious person detection system 100 or 100A can calculate the emotion index based on the change in the emotion of the person, or can execute the behavior analysis processing based on a change in an operation such as a movement or a behavior of a body.

As described above, the cameras C1, . . . in the suspicious person detection system 100 according to the first embodiment or the cameras C1A, . . . in the suspicious person detection system 100A according to the first modification of the first embodiment each calculate the emotion index of the person in response to determining that the first time series data is present for a time equal to or longer than the first predetermined time (an example of the first threshold value) (that is, the data length of the first time series data is equal to or greater than the first threshold value). Accordingly, the suspicious person detection system 100 according to the first embodiment or the suspicious person detection system 100A according to the first modification of the first embodiment can calculate the emotion index of the person with higher accuracy by using the first time series data that is necessary for calculating the emotion index based on the change in the emotion of the person.

As described above, the cameras C1, . . . in the suspicious person detection system 100 according to the first embodiment or the cameras C1A, . . . in the suspicious person detection system 100A according to the first modification of the first embodiment each acquire the behavior analysis information by executing the behavior analysis processing of the person in response to determining that the second time series data is present for a time equal to or longer than the second predetermined time (an example of the second threshold value) (that is, the data length of the second time series data is equal to or greater than the second threshold value). Accordingly, the suspicious person detection system 100 according to the first embodiment or the suspicious person detection system 100A according to the first modification of the first embodiment can execute the behavior analysis processing of the person with higher accuracy by using the second time series data that is necessary for the behavior analysis processing based on the movement or the behavior of the body of the person.

As described above, the cameras C1, . . . in the suspicious person detection system 100 according to the first embodiment or the cameras C1A, . . . in the suspicious person detection system 100A according to the first modification of the first embodiment each acquire the first position information on the person based on the signal (the radio wave), acquire the second position information on the person based on the position of the person appearing in the captured image, and assign the integrated ID (an example of the same identification information) to the vital information and the motion information corresponding to the person by collating the first position information with the second position information. Accordingly, the suspicious person detection system 100 according to the first embodiment or the suspicious person detection system 100A according to the first modification of the first embodiment can manage (record), for each person, the vital information acquired by using the millimeter wave radar 17 and the motion information acquired based on the captured image, which are information related to the same person.

As described above, the cameras C1, . . . in the suspicious person detection system 100 according to the first embodiment or the cameras C1A, . . . in the suspicious person detection system 100A according to the first modification of the first embodiment each transmit, to the server S1 or the server S1A respectively, the person information further including the second position information on the person and the captured image in which the person is imaged. The server S1 or the server S1A superimposes the first frame line (an example of the frame line) on the person appearing in the captured image based on the second position information, and generates and outputs the alarm screen SC1 or SC2 (see FIGS. 8 and 9) including the captured image on which the first frame line is superimposed. Accordingly, the suspicious person detection system 100 according to the first embodiment or the suspicious person detection system 100A according to the first modification of the first embodiment can generate and output (display) the alarm screen SC1 or SC2 in which the person determined to be a suspicious person can be grasped at a glance.

As described above, the cameras C1, . . . in the suspicious person detection system 100 according to the first embodiment or the cameras C1A, . . . in the suspicious person detection system 100A according to the first modification of the first embodiment each transmit, to the server S1 or the server S1A respectively, various data further including the position information on the other persons of which the crime index (score) is not equal to or greater than the third threshold value (an example of the threshold value) (that is, the persons not determined to be suspicious persons), the second position information on the person of which the crime index (score) is equal to or greater than the third threshold value (that is, the person determined to be a suspicious person), and the captured image in which the other persons and the person are imaged. The server S1 or the server S1A superimposes the first frame line (for example, the frame lines FR11 or FR21) on the person appearing in the captured image based on the second position information, superimposes the second frame line (for example, the frame lines FR12, FR13, FR22, or FR23) on the other persons appearing in the captured image based on the position information on the other persons, and generates and outputs the alarm screen SC1 or SC2 including the captured image on which the first frame line and the second frame line are superimposed. Accordingly, the suspicious person detection system 100 according to the first embodiment or the suspicious person detection system 100A according to the first modification of the first embodiment can generate and output (display) the alarm screen SC1 or SC2 with which the person determined to be a suspicious person and the other persons not determined to be suspicious persons can be identified at a glance in the same captured image.

As described above, the server S1 in the suspicious person detection system 100 according to the first embodiment or the server S1A in the suspicious person detection system 100A according to the first modification of the first embodiment generates and outputs, based on various data, the alarm screen SC1 or SC2 further including the report button BT1 or BT2 (see FIGS. 8 and 9) for reporting to the preset report destination. Accordingly, the suspicious person detection system 100 according to the first embodiment or the suspicious person detection system 100A according to the first modification of the first embodiment can support a more prompt report executed by the user.

As described above, the server S1 in the suspicious person detection system 100 according to the first embodiment or the server S1A in the suspicious person detection system 100A according to the first modification of the first embodiment transmits the captured image and the various data to the report destination in a case in which the report button BT1 or BT2 (see FIGS. 8 and 9) is selected by the user operation. Accordingly, the suspicious person detection system 100 according to the first embodiment or the suspicious person detection system 100A according to the first modification of the first embodiment can support a more prompt report executed by the user.

Various embodiments have been described above with reference to the drawings, but the present disclosure is not limited thereto. It is apparent to a person skilled in the art that various changes, modifications, substitutions, additions, deletions, and equivalents can be conceived within the scope of the claims, and it is understood that such modifications also belong to the technical scope of the present disclosure. The respective components in the various embodiments above described may be optionally combined without departing from the gist of the invention.

The present application is based on Japanese Patent Application (Japanese Patent Application No. 2021-036420) filed on Mar. 8, 2021, and the contents thereof are incorporated herein by reference.

INDUSTRIAL APPLICABILITY

The present disclosure is useful as a suspicious person alarm notification system, a suspicious person alarm notification method, and a suspicious person alarm notification program that more efficiently detect a suspicious person with a sign of a crime and efficiently support preventing of occurrence of the crime.

REFERENCE SIGNS LIST 10, 20: communication unit
11, 21: processor
11A, 21A: AI processing unit
12, 22: memory
13: image sensor
14: lens
15 lens driving unit
16: microcontroller
17: millimeter wave radar
23: operation unit
100, 100A, 100B: suspicious person detection system
C1, C1A: camera
DB1: learning model memory
DB2: database
MN: monitor
N1: neural network
NW: network
S1, S1A: server
S2: external server
TP1: security guard terminal

What is claimed is:

1. A suspicious person alarm notification system, comprising:
   at least one camera including artificial intelligence and a radar and being configured to capture an image of a person; and
   a server configured to communicate with the camera, wherein
   the camera is configured to
      receive a signal emitted by the radar and reflected by an object present in an emission direction of the radar,
      acquire vital information on the person from the signal,
      acquire, by using the artificial intelligence, motion information on the person from a captured image obtained by capturing the image of the person,
      calculate, by using the artificial intelligence, an emotion index of the person based on the vital information,
      acquire behavior analysis information by executing behavior analysis processing on the person based on the motion information,
      calculate an index indicating a suspicious person likelihood of the person based on the vital information, the motion information, the emotion index, and the behavior analysis information on the person, and
      transmit, to the server, person information related to the person in which the vital information and the motion information on the person are associated in response to determining that the index is equal to or greater than a threshold value, and
   the server is configured to
      output, based on the person information transmitted from the camera, an alarm indicating that a suspicious person is detected.

2. The suspicious person alarm notification system according to claim 1, wherein
   the camera is configured to
      acquire first position information on the person based on the signal,
      generate, based on the first position information, first time series data in which the vital information on the person is arranged in time series,
      acquire second position information on the person based on a position of the person appearing in the captured image,
      generate, based on the second position information, second time series data in which the motion information on the person is arranged in time series, calculate the emotion index based on the first time series data, and acquire the behavior analysis information by executing the behavior analysis processing based on the second time series data.

3. The suspicious person alarm notification system according to claim 2, wherein
the camera is configured to
calculate the emotion index of the person in response to determining that the first time series data is present for a first predetermined time or more.

4. The suspicious person alarm notification system according to claim 2, wherein
the camera is configured to
acquire the behavior analysis information on the person in response to determining that the second time series data is present for a second predetermined time or more.

5. The suspicious person alarm notification system according to claim 1, wherein
the camera is configured to
acquire first position information on the person based on the signal,
acquire second position information on the person based on a position of the person appearing in the captured image, and
collate the first position information with the second position information to assign same identification information to the vital information and the motion information corresponding to the person.

6. The suspicious person alarm notification system according to claim 5, wherein
the camera is configured to
transmit, to the server, the person information further including the second position information on the person and the captured image in which the person is imaged, and
the server is configured to
superimpose a frame line on the person appearing in the captured image based on the second position information, and
generate and output an alarm screen including the captured image on which the frame line is superimposed.

7. The suspicious person alarm notification system according to claim 5, wherein
the camera is configured to
transmit, to the server, the person information further including third position information on another person of which the index is not equal to or greater than the threshold value, the second position information on the person of which the index is equal to or greater than the threshold value, and the captured image in which the another person and the person are imaged, and
the server is configured to
superimpose a first frame line on the person appearing in the captured image based on the second position information,
superimpose a second frame line on the another person appearing in the captured image based on the third position information on the another person, and
generate and output an alarm screen including the captured image on which the first frame line and the second frame line are superimposed.

8. The suspicious person alarm notification system according to claim 1, wherein the server is configured to
generate and output, based on the person information, an alarm screen further including a report button for reporting to a preset report destination.

9. The suspicious person alarm notification system according to claim 8, wherein
the server is configured to
transmit the captured image and the person information to the preset report destination when the report button is selected by a user operation.

10. A suspicious person alarm notification method that is executed by a computer communicably connected to a server, the server configured to output an alarm indicating that a suspicious person is detected, the suspicious person alarm notification method comprising:
receiving a signal emitted by a radar and reflected by an object present in an emission direction of the radar;
acquiring vital information on a person from the signal;
acquiring, by using artificial intelligence, motion information on the person from a captured image obtained by capturing an image of the person;
calculating, by using the artificial intelligence, an emotion index of the person based on the vital information;
acquiring behavior analysis information by executing behavior analysis processing on the person based on the motion information;
calculating an index indicating a suspicious person likelihood of the person based on the vital information, the motion information, the emotion index, and the behavior analysis information on the person; and
outputting, based on person information related to the person in which the vital information and the motion information on the person are associated, an alarm indicating that a suspicious person is detected in response to determining that the index is equal to or greater than a threshold value.

11. A non-transitory computer readable storage medium storing a computer program that causes a computer to execute the suspicious person alarm notification method according to claim 10.

12. A suspicious person alarm notification system, comprising:
at least one camera including artificial intelligence and a radar and being configured to capture an image of a person; and
a server configured to communicate with the camera, wherein
the camera is configured to
receive a signal emitted by the radar and reflected by an object present in an emission direction of the radar,
acquire vital information on the person from the signal,
acquire, by using the artificial intelligence, motion information on the person from a captured image obtained by capturing the image of the person,
acquire first position information on the person based on the signal,
acquire second position information on the person based on a position of the person appearing in the captured image,
collate the first position information with the second position information to assign same identification information to the vital information and the motion information corresponding to the person,
calculate an index indicating a suspicious person likelihood of the person based on the vital information and the motion information on the person, and transmit, to the server, person information related to the person in which the vital information and the motion information on the person are associated in response to determining that the index is equal to or greater than a threshold value, and the server is configured to output, based on the person information transmitted from the camera, an alarm indicating that a suspicious person is detected.

13. The suspicious person alarm notification system according to claim 12, wherein the camera is configured to transmit, to the server, the person information further including the second position information on the person and the captured image in which the person is imaged, and the server is configured to superimpose a frame line on the person appearing in the captured image based on the second position information, and generate and output an alarm screen including the captured image on which the frame line is superimposed.

14. The suspicious person alarm notification system according to claim 12, wherein the camera is configured to transmit, to the server, the person information further including third position information on another person of which the index is not equal to or greater than the threshold value, the second position information on the person of which the index is equal to or greater than the threshold value, and the captured image in which the another person and the person are imaged, and the server is configured to superimpose a first frame line on the person appearing in the captured image based on the second position information, superimpose a second frame line on the another person appearing in the captured image based on the third position information on the another person, and generate and output an alarm screen including the captured image on which the first frame line and the second frame line are superimposed.

15. A suspicious person alarm notification method that is executed by a computer communicably connected to a server, the server configured to output an alarm indicating that a suspicious person is detected, the suspicious person alarm notification method comprising:

receiving a signal emitted by a radar and reflected by an object present in an emission direction of the radar;

acquiring vital information on a person from the signal;

acquiring, by using artificial intelligence, motion information on the person from a captured image obtained by capturing an image of the person;

acquiring first position information on the person based on the signal;

acquiring second position information on the person based on a position of the person appearing in the captured image;

collating the first position information with the second position information to assign same identification information to the vital information and the motion information corresponding to the person;

calculating an index indicating a suspicious person likelihood of the person based on the vital information and the motion information on the person; and outputting, based on person information related to the person in which the vital information and the motion information on the person are associated, an alarm indicating that a suspicious person is detected in response to determining that the index is equal to or greater than a threshold value.

\* \* \* \* \*